Sept. 23, 1969  ROLF-DIETER KRANZ  3,469,125
ARRANGEMENT OF A DIRECT LIQUID-COOLED SINGLE-PHASE WINDING
FOR SYNCHRONOUS GENERATORS, PARTICULARLY TURBO-GENERATORS
Filed March 27, 1967  7 Sheets-Sheet 2
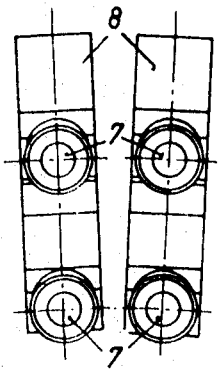
Fig. 3
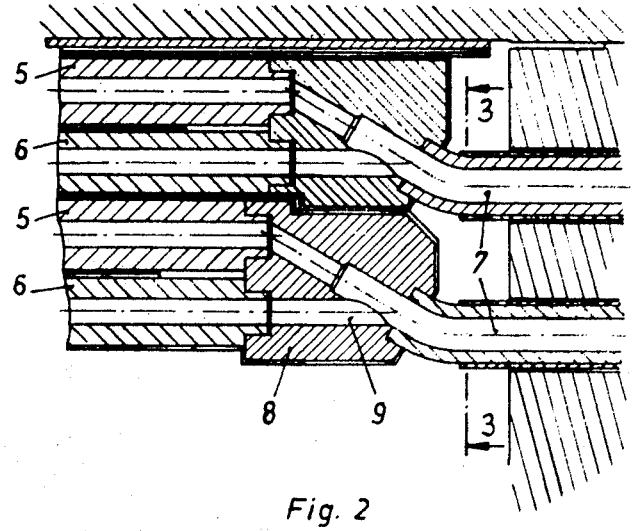
Fig. 2
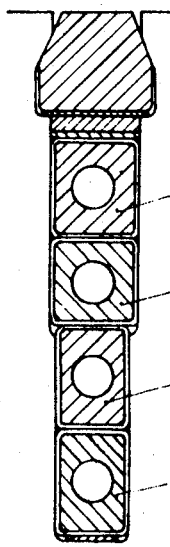
Fig. 4
Fig. 5
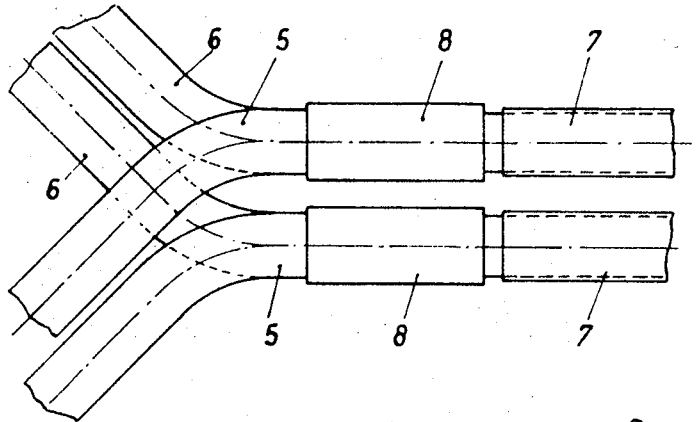
Inventor
Rolf-Dieter Kranz
By Pierce, Scheffler & Parker
Attorneys

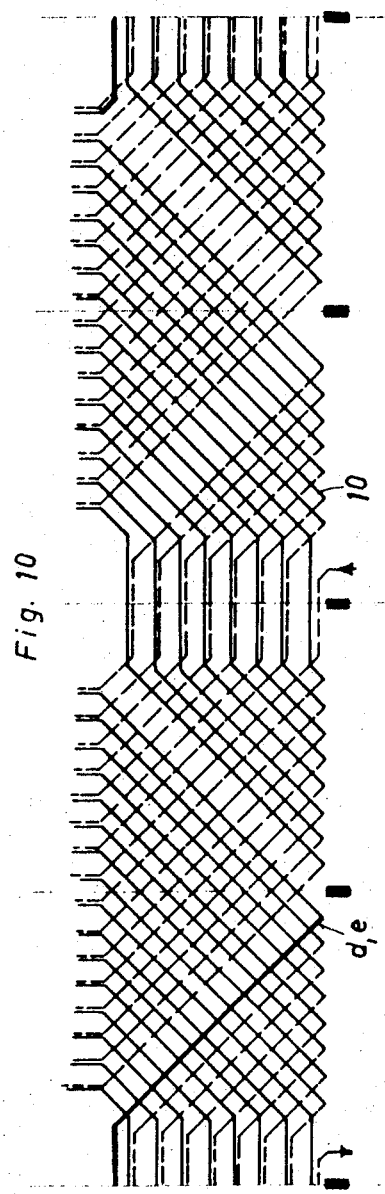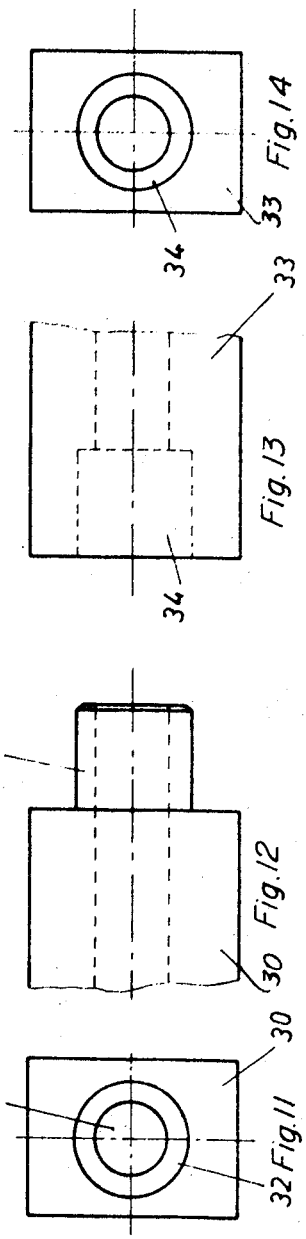

United States Patent Office 3,469,125
Patented Sept. 23, 1969

3,469,125
ARRANGEMENT OF A DIRECT LIQUID-COOLED SINGLE-PHASE WINDING FOR SYNCHRONOUS GENERATORS, PARTICULARLY FOR TURBO-GENERATORS
Rolf-Dieter Kranz, Baden, Switzerland, assignor to Aktiengesellschaft Brown, Boveri & Cie., Baden, Switzerland, a joint-stock company
Filed Mar. 27, 1967, Ser. No. 626,158
Claims priority, application Switzerland, May 3, 1966, 6,417/66
Int. Cl. H02k 9/20
U.S. Cl. 310—54  8 Claims

ABSTRACT OF THE DISCLOSURE

A directly liquid-cooled single-phase winding for a synchronous generator, and particularly a turbogenerator has an even number of conductors in each slot and has at least one end connection thereof constructed as a single or multiple double-layer winging of lap or wave design. In the range of the winding-free zone, the conductors are arranged to lie in the circumferential direction, so as simplify the connections of the cooling medium to the winding and to make them more accessible. The winding structure can be used as the excitation winding on the rotor element of the synchronous generator or on the stator element.

The present invention concerns an arrangement for a directly liquid-cooled single-phase winding for synchronous generators, particularly turbogenerators, where the primary object is to achieve a simplification and improvement as regards the cooling medium connections for the winding, because this is one of the most important problems in connection with this type of machine.

With turbogenerators having an excitation winding which is directly cooled with a liquid, it is known to extend individual turns of the winding so as to pass beyond the chamber in which the end turns are located and to connect these turns by way of radial pipes to axial conduits in the rotor shaft which serve for the supply and discharge of the cooling liquid. The disadvantage of such an arrangement is that a large number of coils have to be connected hydraulically in series and also a large number of radial bores are necessary in the shaft.

Turbogenerators are also known where, within the range of the pole zone, a group of conductors is firmly fixed in a projection of the shaft in such a manner that the water connections for the individual coils can be rigidly joined to the conductor group. In this case it is, however, a disadvantage that within the range of the pole zone the winding oscillates with the shaft whilst outside the pole zone it oscillates with the rotor cap.

In conjunction with turbogenerators, a winding arrangement is also used where the conductors of a layer of a winding zone are all connected in parallel and by means of end connections, which connect the parallel excitation conductors in series, are united to form a wave winding alternately at one or the other end of the machine. The disadvantage of this winding is that a large number of conductors are connected in parallel and the height of the individual conductors is therefore only very small, so that a large number of layers are necessary in order to obtain a reasonable number of turns and an excitation current which is not excessive. When a liquid cooling system is provided, a high static liquid pressure occurs, however in the hollow conductors due to the centrifugal force, and in order to withstand this pressure the conductors require a minimum height. The excitation current thus becomes excessive. The invention thus concerns an arrangement for a directly liquid-cooled single-phase winding for synchronous generators, particularly turbogenerators, where each slot contains an even number of conductors. In order to avoid the aforementioned disadvantages of the hitherto known winding arrangement and, at the same time, to simplify the cooling-medium connections for the winding and to make these connections more accessible, in accordance with the invention at least one end connection of the winding is constructed as a double-layer winding in the form of a wave or lap winding, and in the range of the winding-free zone, the conductors are arranged to lie in the circumferential direction.

The invention is now explained with the aid of the accompanying drawings wherein—

FIG. 2 is a fragmentary view in longitudinal section showing water coolant connections for a two-fold double layer winding;

FIG. 3 is a sectional view taken on line 3—3 of FIG. 2;

FIG. 4 is a sectional view showing the four conductors of the two-fold double-layer winding;

FIG. 5 is a view in plan of the water coolant connections for the arrangement illustrated in FIG. 2;

FIG. 10 is a schematic view of the winding of the type illustrated in FIGS. 6 and 7 showing in particular the pole connections; and FIGS. 11 to 14 are details showing one mode of connecting hollow conductors of a winding of the type illustrated in FIGS. 6 and 7.

Figure 1:
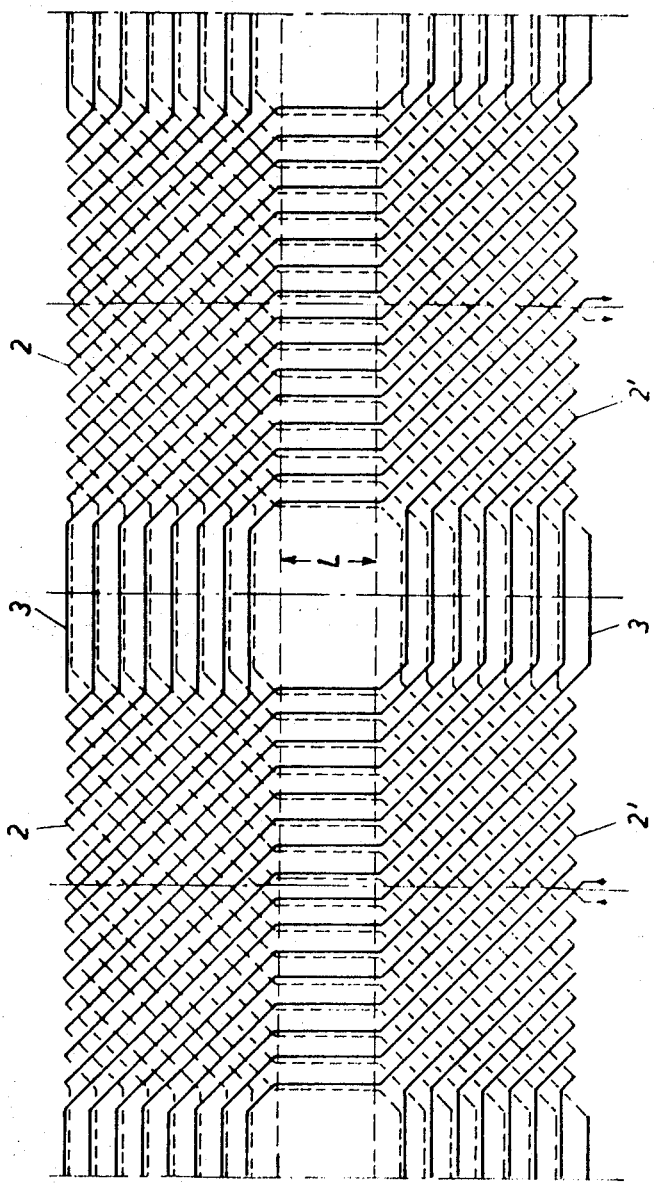
FIG. 1 is a view in development of a single-phase excitation winding of a turbogenerator with all bar conductors connected hydraulically in parallel wherein distribution chambers for supply and discharge of the liquid coolant are located respectively at opposite ends of the machine.

FIG. 1 shows a single-phase excitation winding for a turbogenerator in a developed view. With this winding, both winding ends 2, 2' or end turns of the coils are constructed in the form of a double-layer winding and, within the range of the winding-free zone, the conductors 3 are located so as to run in the circumferential direction. The length of the iron rotor core is indicated by L. This type of winding is particularly favorable when the cooling liquid has to be supplied and discharged at each end of the machine. With a wave winding all the conductor bars are of the same length and the hydraulic resistance in all the conductors is equal. As a result, all conductor bars have the same temperature rise. It is, however, also possible to construct the end turns at each end of the winding in the form of a double layer lap winding if this is desired. It is also an advantage when several double-layer windings are arranged one above the other.

The great advantage of using a double-layer winding for the end turn connection is that the cooling-medium connections for the winding are then located on the outside of the end turns. FIGS. 2 and 3 show by way of an example, two water connections in longitudinal section and end view (as seen from 3—3 in FIG. 2) respectively for a two-fold double-layer winding with four conductors per slot as shown in FIG. 4 in cross-section. FIG. 5 shows a plan view of the cooling-medium connections of FIG. 2. In FIGS. 2 to 5 reference numerals 5 and 6 respectively indicate the bar conductors of each double layer of the winding. Two bar conductors 5, 6 are always supplied in parallel by way of a connection piece 8 with a three-way conduit 9 from a pipe 7. Connection piece 8 also serves as the electrical connection for the bars 5, 6 of both layers of the double-layer winding. The advantage of connecting together bar conductors for supplying the cooling medium is that only half as many insulation elements are necessary when compared with an arrangement where each bar conductor is connected separately to a water distribution chamber. Naturally, each bar 5 and 6 respectively can have its own connection element and also separate electrical and hydraulic connections in which case the three-way conduits 9 are unnecessary. By means of a suitable choice of conductor cross-section, such as is possible with this winding arrangement, the channel inside the conductor for the passage of the cooling medium can have a circular cross-section. The conductors 5, 6 which generally have a rectangular cross-section are machined at their ends to provide a reduced circular cross-section on to which a tubular element can be fitted which by way of an insulating bushing establishes connection with a water distribution chamber as is explained later on.

When all bar conductors are connected hydraulically in parallel a distribution chamber for the cooling liquid must be provided at each end of the machine, one serving for the ingoing liquid and the other one for the outgoing liquid. When it is desired, however, to have the liquid supply and discharge at the same end of the machine, then all turns of the winding are connected in parallel and in this case a winding arrangement such as that shown in FIG. 6 is suitable.

Figure 6:
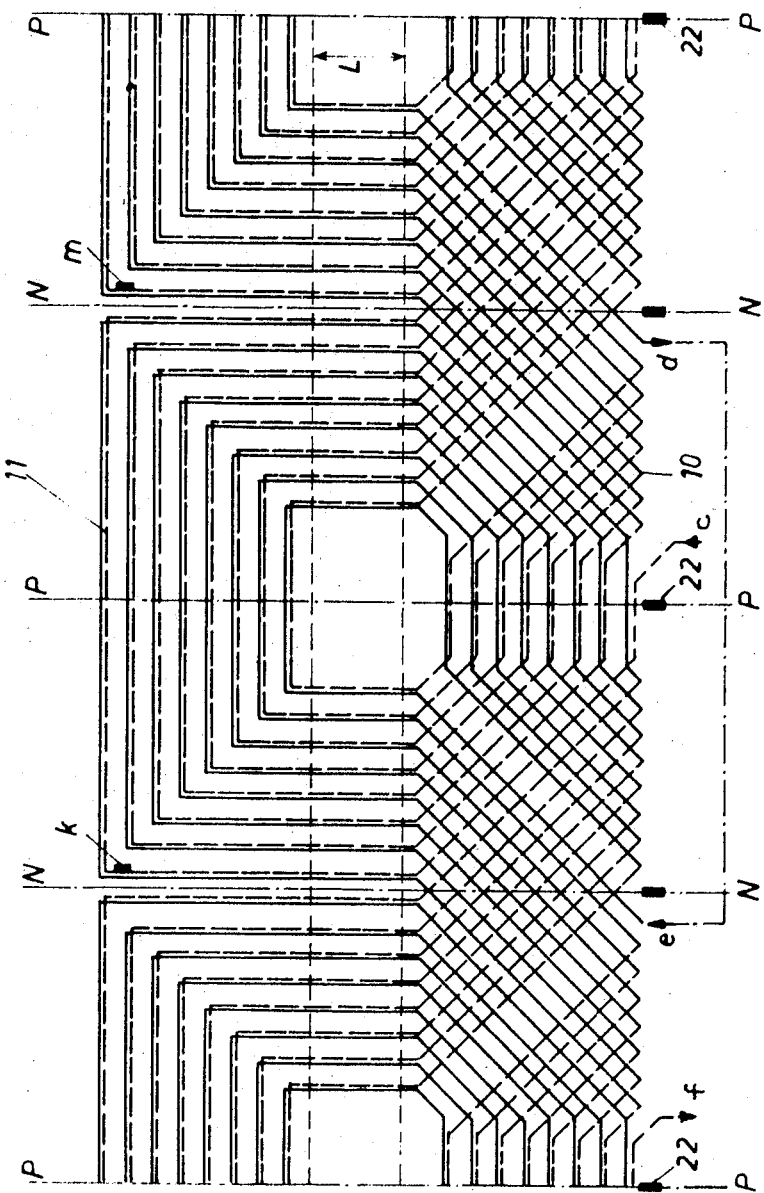
FIG. 6 is a view similar to FIG. 1 for an upper layer of a winding wherein all turns of the winding are connected in parallel and wherein the distribution chambers for supply and discharge of the liquid coolant are located at one end and the same end of the machine.

The constructural example according to FIG. 6 comprises a simple double-layer winding 10, which is constructed as a wave winding, in combination with a concentric winding 11. It possesses the advantages of both kinds of winding, namely standard coil end turns on the one hand and a favorable hydraulic connection on the other hand. Since the liquid flows always through a whole turn of the winding, the supply and discharge of the cooling liquid occurs always at one and the same end of the machine. With this type of winding it is possible to arrange the adjacent hydraulic connections in four groups, two groups serving for the supply and two groups for the discharge of the cooling liquid.

With the winding arrangement shown in FIG. 6, several layers located one above the other are possible. For an arrangement with two layers, FIG. 6 would represent a developed view of the upper layer and FIG. 7 would represent a corresponding developed view of the lower layer, whereby in both figures the neutral axis is indicated by N—N and the pole axis by P—P.

Figure 7:
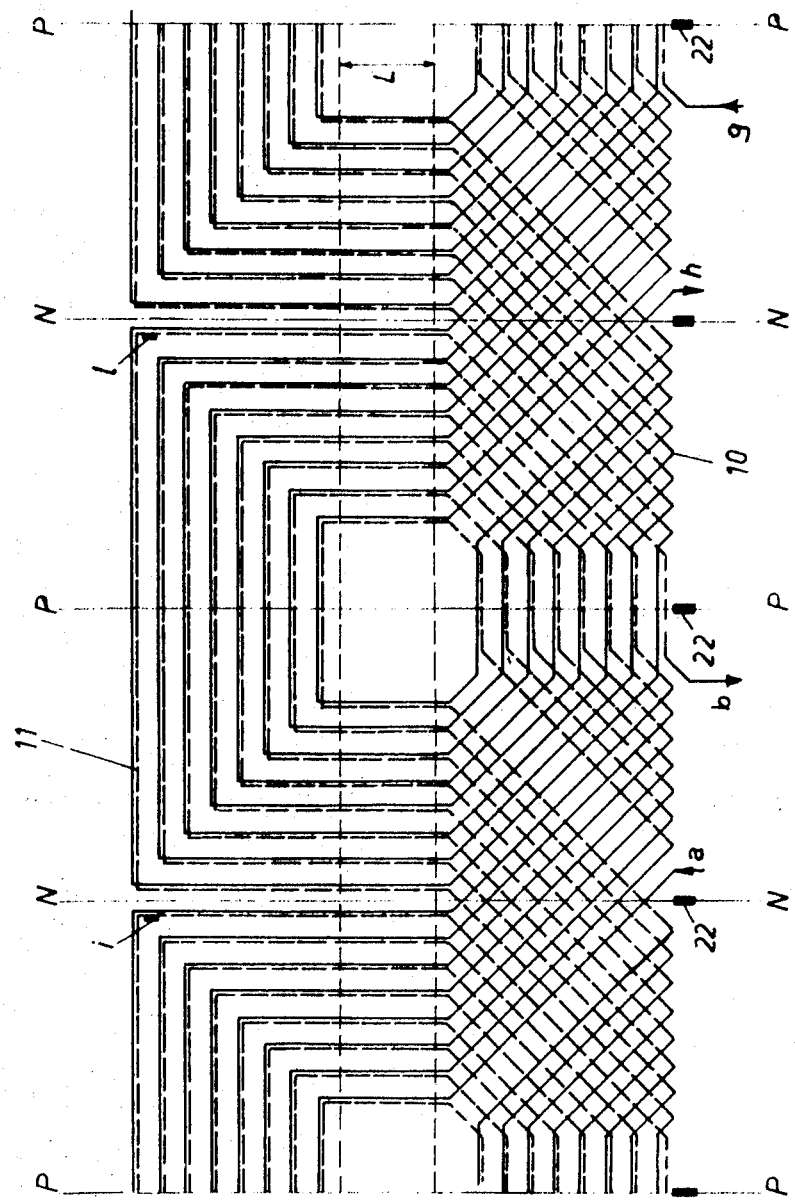
FIG. 7 is a view similar to FIG. 6 for the lower layer of the winding.
Figure 8:
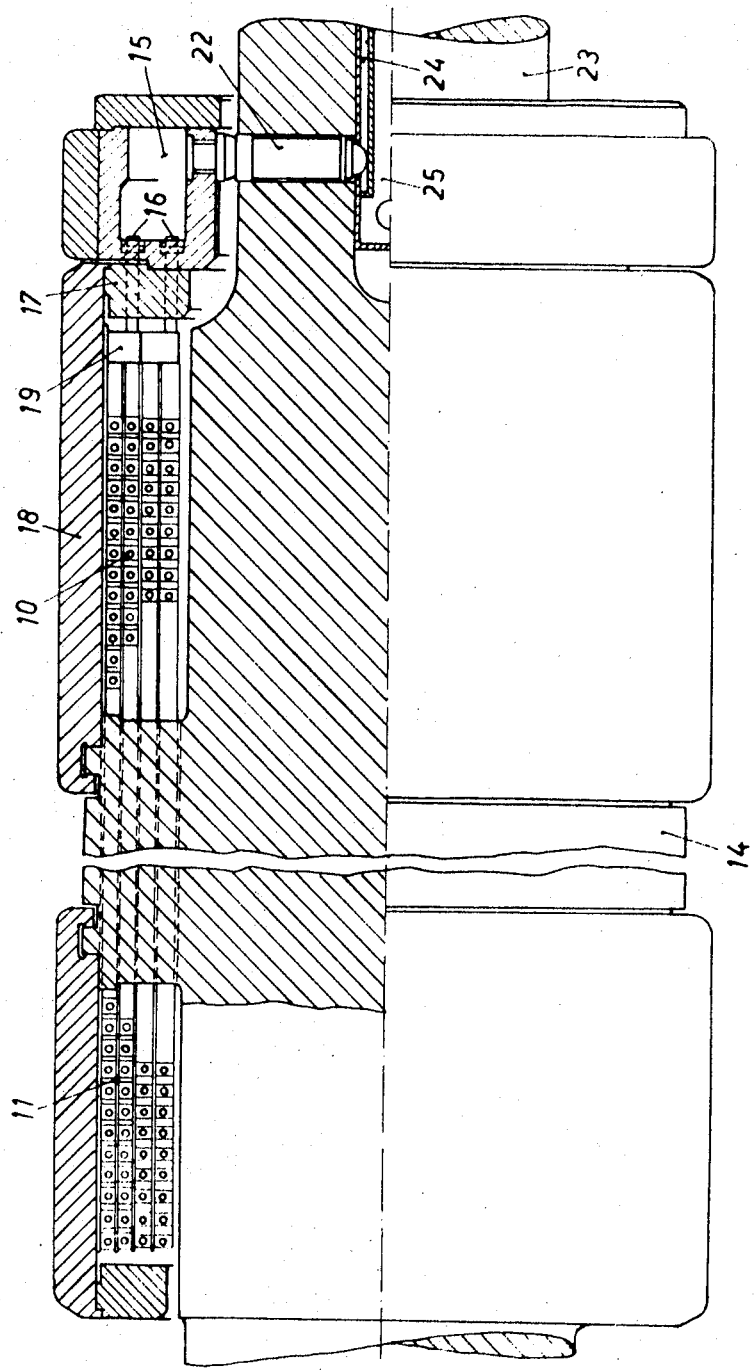
FIG. 8 is a view of the rotor of a turbogenerator partly in longitudinal section and partly in lateral elevation with a winding of the type illustrated schematically in FIGS. 6 and 7.
Figure 9:
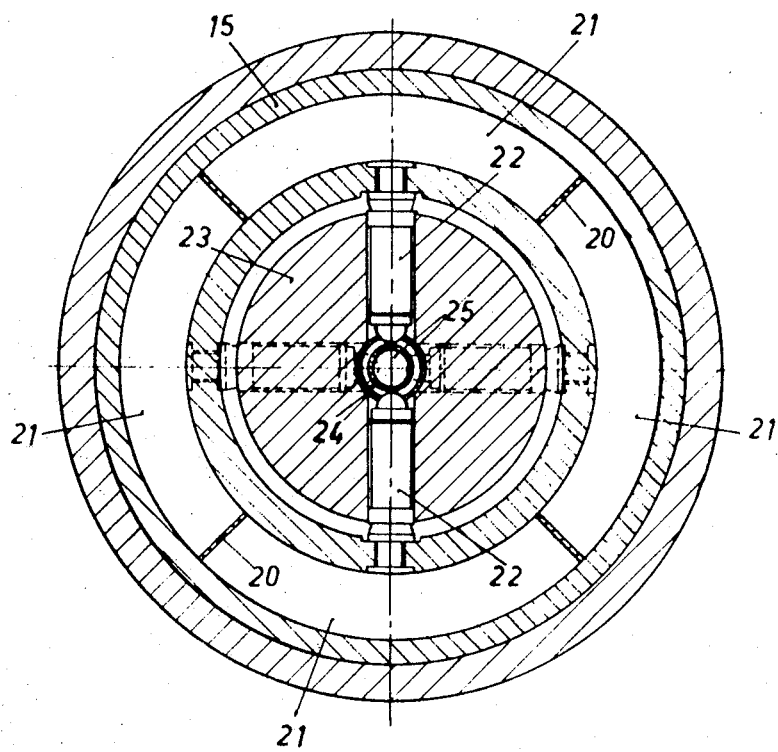
FIG. 9 is a cross-section taken on line 9—9 of FIG. 8 and showing the supply and discharge distribution chambers at the end of the rotor.

FIG. 8 shows the rotor of a turbogenerator partly in longitudinal section and partly in lateral elevation with an excitation winding of the kind shown in FIGS. 6 and 7, whilst FIG. 9 shows a cross-sectional view of the annular chamber which serves as a distributor for the hydraulic connections of this winding.

At the end of the rotor 14 where the end turns of the winding are in the form of the concentric winding 11, there are no hydraulic connections, whilst at the other end where the end turns are in the form of a two-fold double-layer winding 10 there is also the annular chamber 15 to which pipe elements 16, in communication with the winding, are connected. These pipe elements 16 are electrically insulated at the point where they pass through the end plate 17 of the rotor cap 18 to a connecting piece 19 which for instance serves as a common connection for two conductor bars of one winding layer, as has already been described in conjunction with FIGS. 2 to 5.

As shown in FIG. 9, annular chamber 15 is divided tangentially into four equal sub-chambers 21 by means of radial separating walls 20, whereby two diametrically opposing sub-chambers serve for the ingoing cooling liquid and the other two diametrically opposing sub-chambers for the outgoing cooling liquid. These four sub-chambers 21 are each connected by a radial pipe 22 with corresponding supply and discharge channels 24 and 25 respectively located in the centre of shaft 23.

The separating walls 20 of the annular chamber 15 are located in the neutral zone and in the pole zone, and an additional advantage is that the sub-chambers 21 and the cold and heated liquid can be located in a single annular chamber which is subjected to the centrifugal force and the water pressure. The separation of the cold and warm water is achieved in a very simple manner by means of only four walls which only have to withstand the hydraulic pressure drop in the winding. As in the case of the distribution chamber, the active part is also divided into four zones with diametrically opposing warm and cold zones respectively. Thus in one and the same rotor slot there are only bars having the same or approximately the same temperature. Displacement of the conductors of the excitation winding in the active part due to thermal influence are thus prevented.

From FIGS. 6 and 7 it will be noted that each winding layer has two coils, that is to say two current input leads and two current output leads. The electrical connections for the lower and upper layers lie close to each other, however, in the pole and neutral zone, so that it is very easy to make an electrical connection therebetween the lower and upper layer. A series connection of all coils can only be achieved in the following manner. The excitation current is supplied at the point $a$. The coil outlet $b$ has an electrical connection to the coil inlet $c$. Similarly coil outlet $f$ is connected to coil inlet $g$. A pole connection between $d$ and $e$ as indicated by the chain line is necessary. The pole connection can also, as indicated by the thick line in FIG. 10 be laid between the conductors in the double-layer winding end turns 10, whereby the layers are interchanged in the circumferential part. Thus the two ends of the excitation winding are at $a$ and $h$.

The type of winding according to FIGS. 6 and 7 possesses a further advantage. In order to test a rotor at full excitation current and speed and without stator or load, it is known that this is only possible when the external magnetic field is zero or at least very small. Hitherto with concentric windings, the connection of coils in opposition was a complicated and costly operation. Now it is possible to connect coils in opposition in a very simple manner. The electrical connections between $b$ and $c$ as well as between $g$ and $f$ are interrupted, whilst on the other side $i$ is connected to $k$ and $l$ to $m$. These contact points all lie on the outer edge of the coil end turns and are therefore readily accessible. The hydraulic circuit remains unaltered. Nothing has to be opened, because connections $b$ and $c$ as well as $g$ and $h$ are only a single electrical connection. Four conductor bars are then without current, but this is of no account as regards the test.

FIG. 11 illustrates a simple possibility for connecting the hollow conductors of the winding. The individual conductors 30 which have a central bore 31 for the passage of the cooling liquid, are machined at the connecting point to form a circular projecting pipe end 32. The corresponding connecting piece 33 is provided with a bore 34 to match the pipe end 32 so that a plug and socket connection is formed.

Although the winding arrangement described in connection with the invention is especially for turbogenerators with a directly liquid-cooled single-phase excitation winding on the rotor, the winding arrangement according to FIGS. 6 and 7 can also be used as a stator winding for a single-phase synchronous generator.

I claim:
1. In a directly liquid-cooled single phase winding for a synchronous generator of the type wherein an even number of hollow conductors are located in each slot, the improvement wherein an end turn portion of the hollow conductor winding projecting beyond the end of the slot is constructed as a double-layer winding in the form of a wave or lap winding, the conductors of said end turn portion extending in a circumferential direction in the range of the winding free zone, and wherein hydraulic connections to said winding are located at the outer edges of said double-layer winding.

2. A winding for a synchronous generator as defined in claim 1 wherein said double-layer winding is of the wave type, and the end turn portion of said winding at the opposite end of slot is constructed as a concentric winding.

3. A winding for a synchronous generator as defined in claim 2 wherein said wave winding is of the multiple double-layer type.

4. A winding for a synchronous generator as defined in claim 1 wherein the hydraulic connections for each hollow conductor forming said double-layer winding comprise an electrically insulated pipe element connected to a liquid coolant chamber.

5. A winding for a synchronous generator as defined in claim 1 wherein the hydraulic connections for the hollow conductors forming said double layer end turn portion of said winding include a connection pipe common to both conductors, said connection pipe being also electrically conductive thereby to establish an electrical connection to said conductors.

6. A winding for a synchronous generator as defined in claim 1 which comprises a plurality of double layer windings for the end turn portions of said winding and which are arranged one above the other, all turns of all layers being connected electrically in series and hydraulically in parallel for the flow of the liquid coolant, the electrical connections of said windings being located on the outer edge of said end turn portions and serving at the same time as hydraulic connections for the liquid coolant.

7. An excitation winding for the rotor of a synchronous machine as defined in claim 1 wherein the end turn portion at one end of the rotor slots is constructed as said double-layer wave winding and the end turn portion at the opposite end of the rotor slots is constructed as a concentric winding, and wherein the pole connections are located between other excitation conductors.

8. An excitation winding for the rotor of a synchronous machine as defined in claim 1 wherein the end turn portion at one end of the rotor slots is constructed as said double-layer wave winding and the end turn portion at the opposite end of the rotor slots is constructed as a concentric winding, and wherein terminals are provided at the outer edges of said concentric winding, said terminals enabling a pole-reversal of half the turns required when testing the winding with ful lexcitation current.

References Cited
UNITED STATES PATENTS

| | | | |
|---|---|---|---|
| 2,897,382 | 7/1959 | Hamill | 310—54 |
| 3,185,872 | 5/1965 | Weissheimer | 310—54 |
| 3,243,616 | 3/1966 | Tudge | 310—54 |

WARREN E. RAY, Primary Examiner

R. SKUDY, Assistant Examiner

U.S. Cl. X.R.

310—64